United States Patent
Yamamoto et al.

(10) Patent No.: US 8,388,915 B2
(45) Date of Patent: Mar. 5, 2013

(54) BASIC MAGNESIUM SULFATE GRANULE HAVING HIGH CRUSH STRENGTH AND PROCESS FOR PRODUCTION THEREOF

(75) Inventors: Shinichi Yamamoto, Yamaguchi (JP);
Takashi Kishimoto, Yamaguchi (JP)

(73) Assignee: Ube Material Industries, Ltd., Ube-shi, Yamaguchi (JP)

( * ) Notice: Subject to any disclaimer, the term of this patent is extended or adjusted under 35 U.S.C. 154(b) by 232 days.

(21) Appl. No.: 12/935,374

(22) PCT Filed: Mar. 30, 2009

(86) PCT No.: PCT/JP2009/056472
§ 371 (c)(1),
(2), (4) Date: Sep. 29, 2010

(87) PCT Pub. No.: WO2009/123097
PCT Pub. Date: Oct. 8, 2009

(65) Prior Publication Data
US 2011/0014470 A1    Jan. 20, 2011

(30) Foreign Application Priority Data
Mar. 31, 2008 (JP) .................. 2008-091703

(51) Int. Cl.
*C01F 1/00* (2006.01)
*C01F 5/40* (2006.01)
(52) U.S. Cl. ......... 423/158; 423/161; 423/164; 423/554
(58) Field of Classification Search ............... 423/554, 423/158, 161, 164; 428/402
See application file for complete search history.

(56) References Cited

U.S. PATENT DOCUMENTS

| | | | | |
|---|---|---|---|---|
| 2,218,551 | A * | 10/1940 | Richards | 423/554 |
| 3,506,465 | A * | 4/1970 | Keller et al. | 106/683 |
| 5,021,226 | A * | 6/1991 | Ueno et al. | 423/554 |
| 5,082,646 | A * | 1/1992 | Ueno et al. | 423/554 |
| 5,262,147 | A * | 11/1993 | Miyata | 423/554 |
| 8,114,366 | B2 * | 2/2012 | Adachi | 423/166 |
| 8,178,069 | B2 * | 5/2012 | Yamamoto et al. | 423/554 |

(Continued)

FOREIGN PATENT DOCUMENTS

| | | |
|---|---|---|
| JP | 56-149318 | 11/1981 |
| JP | 01-306437 | 12/1989 |

(Continued)

OTHER PUBLICATIONS

International Search Report (Application No. PCT/JP2009/056472) dated May 12, 2009.

(Continued)

*Primary Examiner* — Hoa (Holly) Le
(74) *Attorney, Agent, or Firm* — Nixon Peabody LLP; Jeffrey L. Costellia

(57) ABSTRACT

A method for producing basic magnesium sulfate granules, by heating a water-containing granular composition to a temperature of 50-250° C. to dryness. The granular composition has a water content of 10-60 wt. % and comprises fibrous basic magnesium sulfate particles, magnesium hydroxide in an amount of 5-300 weight parts per 100 weight parts of the fibrous basic magnesium sulfate particles, magnesium sulfate in an amount of 0.1-200 weight parts per 100 weight parts of a total amount of the fibrous basic magnesium sulfate particles and magnesium hydroxide. This method can give basic magnesium sulfate granules having a low bulk density and a high crushing strength.

10 Claims, 3 Drawing Sheets

U.S. PATENT DOCUMENTS

| | | | |
|---|---|---|---|
| 8,247,485 B2* | 8/2012 | Yamamoto et al. | 524/423 |
| 2003/0060553 A1* | 3/2003 | Ohkawa et al. | 524/423 |
| 2011/0042297 A1* | 2/2011 | Yamamoto et al. | 210/263 |

FOREIGN PATENT DOCUMENTS

| | | |
|---|---|---|
| JP | 03-122012 | 5/1991 |
| JP | 03-122013 | 5/1991 |
| JP | 04-074709 | 3/1992 |
| JP | 04-317406 | 11/1992 |
| JP | 06-226017 | 8/1994 |
| JP | 2003-047972 | 2/2003 |
| JP | 2005-231927 | 9/2005 |
| JP | 2007-161954 | 6/2007 |
| WO | WO 2009-119814 | * 10/2009 |

OTHER PUBLICATIONS

Yue Tae et al., "Crystal growth and crystal structure of magnesium oxysulfate $2MgSO_4 \cdot Mg(OH)_2 \cdot 2H_2O$", Journal of Molecular Structure, 2002, vol. 616, pp. 247-252.

* cited by examiner

BASIC MAGNESIUM SULFATE GRANULE HAVING HIGH CRUSH STRENGTH AND PROCESS FOR PRODUCTION THEREOF

FIELD OF THE INVENTION

The present invention relates to basic magnesium sulfate granules favorably employable as wastewater-processing material and methods for producing the same.

BACKGROUND OF THE INVENTION

It is known that particles of fibrous basic magnesium sulfate [$MgSO_4 \cdot 5Mg(OH)_2 \cdot 3H_2O$] are utilized as wastewater-processing material. This utilization is disclosed in the following published documents.

JP-A-6-226017 discloses a method for removing fine particles and oil from wastewater, by the use of basic magnesium sulfate granules comprising a plurality of fibrous basic magnesium sulfate particles. This document describes a method comprising the steps of bringing the basic magnesium sulfate granules into contact with wastewater containing fine particles and oil to aggregate the fine particles and oil on the granules, filtering the aggregated fine particles and floating the aggregated oil for separation.

JP-A-2005-231927 discloses basic magnesium sulfate granules comprising a plurality of fibrous basic magnesium sulfate particles bonded together with fibrous inorganic material such as xonotlite or sepiolite or fibrillated polytetrafluoroethylene. It is stated that the basic magnesium sulfate granules can well maintain their form in running water as compared with basic magnesium sulfate granules produced without employing a binder, and hence these are useful as wastewater processing material.

This document further describes that basic magnesium sulfate is employable for removing silica and lead by adsorption.

JP-A-2003-47972 discloses a method for removing fluorine from wastewater discharged from desulfurization apparatuses which comprises placing magnesium hydroxide as a desulfurising agent in the desulfurization apparatus and adding sodium hydroxide to the wastewater discharged from the apparatus, whereby producing basic magnesium sulfate having adsorbed fluorine and magnesium hydroxide.

As is described above, the granules comprising fibrous basic magnesium sulfate particles can aggregate fine particles and oil contained in wastewater and remove heavy metals and fluorine by adsorption, and hence are valuable as wastewater-processing material.

The basic magnesium sulfate granules to be used as wastewater-processing material preferably have spaces inside of the granule so that water can easily enter the spaces, that means to have a low bulk density, and preferably well maintain their form in running water so that the fibrous particles are well kept in the granules when the granules are placed in running water, that means to have a high strength.

The present inventors have noted that the known basic magnesium sulfate granules do not have a strength enough for employing as wastewater-processing material and that basic magnesium sulfate granules having an increased strength are required.

SUMMARY OF THE INVENTION

Accordingly, it is an object of the invention to provide basic magnesium sulfate granules having a low bulk density and a high strength and processes for producing the same.

The present inventors have found that basic magnesium sulfate granules having a low bulk density and a high crushing strength can be produced by preparing a water-containing granular composition comprising a plurality of fibrous basic magnesium sulfate particles, magnesium hydroxide, magnesium sulfate and water in predetermined ratio and heating the water-containing granular composition to a temperature of 50 to 250° C.

Accordingly, the present invention resides in a method for producing basic magnesium sulfate granules, which comprises heating a water-containing granular composition to a temperature of 50 to 250° C. for at least one hour, the water-containing granular composition having a water content of 10 to 60 wt. % and comprising fibrous basic magnesium sulfate particles, magnesium hydroxide in an amount of 5 to 300 weight parts based on 100 weight parts of the fibrous basic magnesium sulfate particles, magnesium sulfate in an amount of 0.1 to 200 weight parts based on 100 weight parts of a total amount of the fibrous basic magnesium sulfate particles and magnesium hydroxide.

Preferred embodiments of the above-mentioned method are described below.

(1) The fibrous basic magnesium sulfate particles have a mean length in the range of 3.0 to 200 μm, a mean thickness in the range of 0.2 to 3.0 μm, and a mean aspect ratio of 3 or more.

(2) The magnesium hydroxide is in the form of particles having a mean diameter in the range of 0.1 to 10 μm.

(3) The magnesium hydroxide is contained in an amount of 5 to 200 weight parts based on 100 weight parts of the fibrous basic magnesium sulfate particles.

(4) The magnesium sulfate is contained in an amount of 0.04 to 1 mole based on one mole of the magnesium hydroxide.

The invention further resides in a method for producing basic magnesium sulfate granules, which comprises the steps of:

preparing an aqueous dispersion which comprises fibrous basic magnesium sulfate particles and magnesium hydroxide particles in an aqueous solution containing 1 to 40 wt. % of magnesium sulfate, the magnesium hydroxide particles being in an amount of 5 to 300 weight parts per 100 weight parts of the fibrous basic magnesium sulfate particles;

subjecting the aqueous dispersion to a dehydration procedure to give a water-containing composition containing 10 to 60 wt. % of water;

granulating the water-containing composition to give a water-containing granular composition; and heating the water-containing granular composition to a temperature of 50 to 250° C. for at least one hour.

The invention furthermore resides in a method for producing basic magnesium sulfate granules, which comprises the steps of:

granulating a mixture of fibrous basic magnesium sulfate particles, magnesium hydroxide particles and an aqueous solution containing 1 to 40 wt. % of magnesium sulfate, the magnesium hydroxide particles being in an amount of 5 to 300 weight parts per 100 weight parts of the fibrous basic magnesium sulfate particles, to give a water-containing granular composition containing 10 to 60 wt. % of water; and heating the water-containing granular composition to a temperature of 50 to 250° C. for at least one hour.

The basic magnesium sulfate granules produced by the above-mentioned methods have a crushing strength in the range of 1.0 to 10.0 kg and a bulk density in the range of 0.5 to 1.5 g/cm³.

Accordingly, the invention also resides in basic magnesium sulfate granules comprising fibrous basic magnesium sulfate particles, which have a crushing strength in the range of 1.0 to 10.0 kg and a bulk density in the range of 0.5 to 1.5 g/cm$^3$.

EFFECTS OF THE INVENTION

The methods of the invention make it possible to produce basic magnesium sulfate granules having a low bulk density and a high crushing strength advantageously in industry.

The basic magnesium sulfate granules of the invention have a high crushing strength regardless of having a low bulk density, and hence are valuable as wastewater-processing material.

PREFERRED EMBODIMENTS OF THE INVENTION

In the method of the invention, magnesium hydroxide, magnesium sulfate and water are added in the predetermined ratio to multiple fibrous basic magnesium sulfate particles to give a water-containing granular composition which is then heated to a temperature of 50° C. or higher.

The fibrous basic magnesium sulfate particles employed in the invention preferably have a mean length in the range of 3.0 to 200 μm, a mean thickness in the range of 0.2 to 3.0 μm, and an mean aspect ratio of 3 or more.

In the water-containing granular composition, magnesium hydroxide is preferably present in the form of particles having a mean diameter in the range of 0.1 to 10 μm. The magnesium hydroxide is contained in the water-containing granular composition in an amount of generally 5 to 300 weight parts, preferably 5 to 200 weight parts, based on 100 weight parts of the fibrous basic magnesium sulfate particles.

Magnesium sulfate is preferably dissolved in water of the water-containing composition. The magnesium sulfate is contained in the water-containing granular composition in an amount of generally 0.1 to 200 weight parts, preferably 0.1 to 120 weight parts, based on 100 weight parts of the total of the amount of fibrous basic magnesium sulfate particles and magnesium hydroxide. It is preferred that magnesium sulfate is contained in the water-containing granular composition in an amount of 0.04 mole or more, specifically in the range of 0.04 to 1 mole, per one mole of magnesium hydroxide.

The water-containing granular composition may further contain fibrous inorganic materials such as xonotlite and sepiolite. The fibrous inorganic materials may be contained in an amount of generally 1 to 40 weight parts, preferably 5 to 30 weight parts, based on 100 weight parts of the fibrous basic magnesium sulfate particles.

The water-containing granular composition contains water in an amount of 10 to 60 wt. %, that is "water content". The water content of the water-containing granular composition is expressed in terms of percentage of "loss of drying" which is determined by heating a sample to 180° C. by infra-red heating.

The water-containing granular composition is heated to a temperature of generally 50 to 250° C., preferably 50 to 130° C., more preferably 90 to 120° C. The heating is performed for generally one hour or more, preferably for 5 to 100 hours.

The water-containing granular composition can be produced, for instance, by the steps of preparing an aqueous dispersion comprising fibrous basic magnesium sulfate particles and magnesium hydroxide particles in an aqueous magnesium sulfate solution (concentration of magnesium sulfate: 1 to 40 wt. %) under the condition that 5 to 300 weight parts of the magnesium hydroxide particles are present based on 100 weight parts of the fibrous basic magnesium sulfate particles, subjecting the aqueous dispersion to dehydration to give a water-containing solid composition having a water content of 10 to 60 wt. %, and granulating the water-containing solid composition.

The aqueous magnesium sulfate solution used for producing the water-containing granular composition preferably has a concentration of 1 to 30 wt. %, more preferably 1 to 10 wt. %.

The aqueous dispersion comprising fibrous basic magnesium sulfate particles and magnesium hydroxide particles dispersed in an aqueous magnesium sulfate solution can be prepared by any one of the following methods: a method of adding simultaneously fibrous basic magnesium sulfate particles and magnesium hydroxide particles to an aqueous magnesium sulfate solution; a method of adding magnesium hydroxide particles to an aqueous magnesium sulfate solution containing fibrous basic magnesium sulfate particles dispersed therein; and a method of adding fibrous basic magnesium sulfate particles to an aqueous magnesium sulfate solution containing magnesium hydroxide particles dispersed therein. The magnesium hydroxide particles can be replaced with magnesium oxide particles.

Otherwise, magnesium hydroxide particles can be produced by converting a portion of the magnesium sulfate by the addition of an alkaline compound such as sodium hydroxide or ammonia.

The water-containing solid composition can be obtained by dehydrating the aqueous dispersion by known solid-liquid separation procedures such as filtration, decantation and centrifugal separation. Otherwise, the aqueous dispersion can be heated for removing water.

The water-containing solid composition can be granulated by conventional granule-forming procedures such as extrusion molding, compression molding and rolling molding.

The water-containing granular composition also can be produced by the steps of adding magnesium hydroxide particles and an aqueous magnesium sulfate solution having a concentration of 1 to 40 wt. % to fibrous basic magnesium sulfate particles in which 5 to 300 weight parts of the magnesium hydroxide are added to 100 weight parts of the fibrous basic magnesium sulfate particles and granulating the resulting mixture of fibrous basic magnesium sulfate particles, magnesium hydroxide particles and an aqueous magnesium sulfate solution. The aqueous magnesium sulfate solution is added in such amount that the water-containing granular composition can have a water content of 10 to 60 wt. %.

In more detail, the procedure can be performed by the steps of placing fibrous basic magnesium sulfate particles in a granulating apparatus for rolling material for granulation, adding magnesium hydroxide particles and an aqueous magnesium sulfate solution to the fibrous basic magnesium sulfate particles, and after completion of the latter addition or during the latter addition, rolling the resulting mixture. The magnesium hydroxide particles and aqueous magnesium sulfate solution can be added simultaneously or independently. For instance, the addition of an aqueous magnesium sulfate solution can be performed after the addition of magnesium hydroxide particles.

The granulating apparatus for rolling material for granulation can be a rolling-granulating apparatus or a stirring-granulating apparatus. The rolling-granulating apparatus applies rolling movement to material by rotation of the apparatus or a rotor attached to the apparatus. The stirring-granulating apparatus applies rolling movement to material by stirring with an agitating blade.

The thus produced basic magnesium sulfate granules generally have a crushing strength in the range of 1.0 to 10.0 kg and a bulk density in the range of 0.5 to 1.5 g/cm$^3$. In other words, the basic magnesium sulfate granules of the invention have such high crushing strength in the range of 1.0 to 10.0 kg, though the granules have a low bulk density as compared with the true density (i.e., 2.3 g/cm$^3$) so as to have a large space in the range of approx. 22 to 65% inside of the granule.

The reason why the basic magnesium sulfate granules of the invention show a high crushing strength can be explained by referring to FIG. 1 in which a reaction product 2 of magnesium hydroxide and magnesium sulfate in the presence of water partly deposits in the site at which the fibrous basic magnesium sulfate particle 1a and the fibrous basic magnesium sulfate particle 1b crosses and binds both fibrous particles. The presence of the reaction product can be observed by electron microscope.

The basic magnesium sulfate granules can take any forms such as globes, cylinders, almonds, and flakes.

The basic magnesium sulfate granules of the invention have a low bulk density and enough space inside, water can easily enter. Further, since the basic magnesium sulfate granules of the invention has a high crushing strength, the granules maintains their form in water.

Therefore, the basic magnesium sulfate granules can be favorably employed as wastewater-processing material.

A wastewater-processing apparatus charged with the basic magnesium sulfate granules of the invention can be placed in a water-running path for removing heavy metals such as lead and fluorine in the wastewater by adsorption and aggregating fine particles and oil on the granules for a long period of time.

EXAMPLES

The water content of the water-containing granular compositions of the below-given examples was determined by means of an infrared water-content analyzer (FD-800, available from Kett Electric Laboratory Co., Ltd.) at 180° C. in an automatic mode.

The crushing strength, bulk density, loose density and specific surface area were determined by the below-described procedures.

[Determination of Crushing Strength]

The sample granule is compressed in an automatic tester autograph AG-1 (available from Shimazu Corporation, Ltd.) by moving a pressing member at a rate (cross head rate) of 0.5 mm/sec. The load (test force, unit: N) applied to the sample granule is measured in progress of time. From the variation of the test force in progress of time, the first peak is read and its value is converted into a load (kg). The determination is performed five times and their average value is used as a crushing strength. If the sample granule is in the form of cylinder, the load is applied to the side face of granule.

[Determination of Bulk Density]

The bulk density is determined by the bulk density-measuring method (Archimedes method for magnesia clinker utilizing kerosene) established by Refractory Technology Society, Science Promoting Committee.

[Determination of Loose Density]

The loose density is determined by means of a powder tester (available by Hosokawa Micron Co., Ltd.) by placing the sample granules in a 100 cm$^3$-volume vessel and calculating by subtracting the weight of the vessel (100 cm$^3$) from the weight of the granules with the vessel.

[Determination of Specific Surface Area]

The specific surface area is determined by the BET single-point method using nitrogen gas.

Example 1

In 98 kg of an aqueous magnesium sulfate solution having a magnesium sulfate concentration of 5.0 wt. % (in terms of anhydrous magnesium sulfate) were placed 2.0 kg of fibrous basic magnesium sulfate particles (mean length: 20.0 µm, mean thickness: 0.5 µm), and the mixture was stirred to give an aqueous magnesium sulfate solution of pH 8.8 containing basic magnesium sulfate particles. To the aqueous magnesium sulfate solution containing basic magnesium sulfate particles dispersed therein were added 0.4 kg of magnesium hydroxide fine particles (mean diameter: 2.9 µm) and stirred, to prepare an aqueous dispersion containing fibrous basic magnesium sulfate particles and magnesium hydroxide particles dispersed in an aqueous magnesium sulfate solution. The resulting aqueous dispersion showed pH 9.4.

The above-mentioned aqueous dispersion was subjected to solid-liquid separation by vacuum filtration, to recover a water-containing solid composition. The water-containing solid composition was dehydrated under pressure in a felt-press dehydrating apparatus. The thus dehydrated composition was then granulated in an extrusion-granulating apparatus (Meat Chopper, available from Hiraga Manufacturing Co., Ltd., opening size: 2.3 mm), to give cylindrical granules of a water-containing composition. The resulting cylindrical granules had a water content of 45 wt. % and comprised 41.5 wt. % of fibrous basic magnesium sulfate particles, 8.3 wt. % of magnesium hydroxide particles and 50.2 wt. % of an aqueous magnesium sulfate solution. The cylindrical granules were then heated in a box dryer at 110° C. for 48 hours, to give basic magnesium sulfate cylindrical granules having a mean diameter of 2.5 mm and a mean height of 3.5 mm.

Electron microscopic observation on the resulting basic magnesium sulfate granules revealed that a reaction product deposited on the sites where one fibrous particle crossed another fibrous particle, as is shown in FIG. 2.

The basic magnesium sulfate granules were subjected to determinations of the crushing strength, bulk density, loose density and specific surface area. The results are set forth in Table 1.

FIG. 3 graphically shows a variation of the test force in progress of time measured on the basic magnesium sulfate granules under compressing load in a pressing machine. As seen in FIG. 3, the first peak value of test force was 22.7 N. This means that the crushing strength is 2.3 kg (=22.7/9.8)

Comparison Example 1

The procedures of Example 1 were repeated except that no magnesium hydroxide fine particles were added to the aqueous magnesium sulfate solution containing basic magnesium sulfate particles dispersed therein, to prepare basic magnesium sulfate granules. The resulting granules had a mean diameter of 2.5 mm and a mean length of 3.5 mm.

Electron microscopic observation on the resulting basic magnesium sulfate granules revealed that no reaction product deposited on the sites where one fibrous particle crossed another fibrous particle.

The basic magnesium sulfate granules were subjected to determinations of the crushing strength, bulk density, loose density and specific surface area. The results are set forth in Table 1.

Comparison Example 2

Corresponding to Example 1 Seen in JP-A-2005-231927
In 194 kg of water were dispersed 6 kg of fibrous basic magnesium sulfate particles (mean length: 28 mean thickness: 0.5 μm), to prepare an aqueous dispersion containing fibrous basic magnesium sulfate. The aqueous dispersion was subjected to solid-liquid separation by vacuum filtration and dehydrated under pressure in a felt-press dehydrating apparatus, give a water-containing solid composition having a water content of 50 wt. %. To 2 kg of the water-containing solid composition were added fibrous xonotlite particles (mean length: 3 μm, mean thickness: 0.3 μm) in such an amount that the content of xonotlite in the solid composition would be 20 wt. %, and the mixed. The mixture was then granulated in an extrusion-granulating apparatus (Meat Chopper, opening size: 2.3 mm), to give a water-containing composition in the form of cylindrical granules. The cylindrical granules were dried in a box dryer at 120° C. for 24 hours to give basic magnesium sulfate cylindrical granules (mean diameter: 2.5 mm, mean height: 3.5 mm) of a water-containing composition.

The basic magnesium sulfate granules were subjected to determinations of the crushing strength, bulk density, loose density and specific surface area. The results are set forth in Table 1.

Example 2

In 2.0 kg of an aqueous magnesium sulfate solution having a magnesium sulfate concentration of 5.0 wt. % (concentration in terms of anhydride) were placed 0.13 kg of magnesium hydroxide fine particles, and stirred, to prepare an aqueous magnesium sulfate solution (pH 9.8) containing magnesium hydroxide particles dispersed therein.

Independently, 1.0 kg of fibrous basic magnesium sulfate particles having a mean length of 10.0 μm and a mean thickness of 0.5 μm were placed in an Apex Granulator (stirring-granulating apparatus available from Pacific Machinery & Engineering Co., Ltd.). While 1.32 kg of the aforementioned magnesium hydroxide particle-containing aqueous magnesium sulfate solution was added portionwise to the fibrous basic magnesium sulfate particles, the resulting mixture was rolled to give a globular water-containing granular composition. The resulting water-containing granular composition had a water content of 45 wt. %. The water-containing granular composition was dried in a box dryer at 110° C. for 48 hours, to give basic magnesium sulfate granules.

Electron microscopic observation on the resulting basic magnesium sulfate granules revealed that a reaction product deposited on the sites where one fibrous particle crossed another fibrous particle, as is observed in Example 1.

The basic magnesium sulfate granules were subjected to determinations of the crushing strength, bulk density, loose density and specific surface area. The results are set forth in Table 1.

Comparison Example 3

The procedures of Examples 2 were repeated except that the aqueous magnesium sulfate solution containing magnesium hydroxide particles was replaced with 1.32 kg of tap water, to prepare basic magnesium sulfate granules.

Electron microscopic observation on the resulting basic magnesium sulfate granules revealed that no reaction product deposited on the sites where one fibrous particle crossed another fibrous particle.

The basic magnesium sulfate granules were subjected to determinations of the crushing strength, bulk density, loose density and specific surface area. The results are set forth in Table 1.

TABLE 1

|  | Crushing strength (kg) | Bulk density (g/cm$^3$) | Loose density (g/cm$^3$) | Specific surface area (m$^2$/g) |
|---|---|---|---|---|
| Example 1 | 2.3 | 0.81 | 0.41 | 5.2 |
| Com. Ex. 1 | 0.18 | 0.71 | 0.40 | 8.4 |
| Com. Ex. 2 | 0.37 | 0.79 | 0.46 | 8.9 |
| Example 2 | 1.6 | 0.96 | 0.55 | 6.9 |
| Com. Ex. 3 | 0.1 | 0.78 | 0.46 | 9.0 |

As is seen from the results set forth in Table 1, the basic magnesium sulfate granules obtained by the method of the invention show a high crushing strength, as compared with the basic magnesium sulfate granules obtained by the conventional methods.

Figure 1:
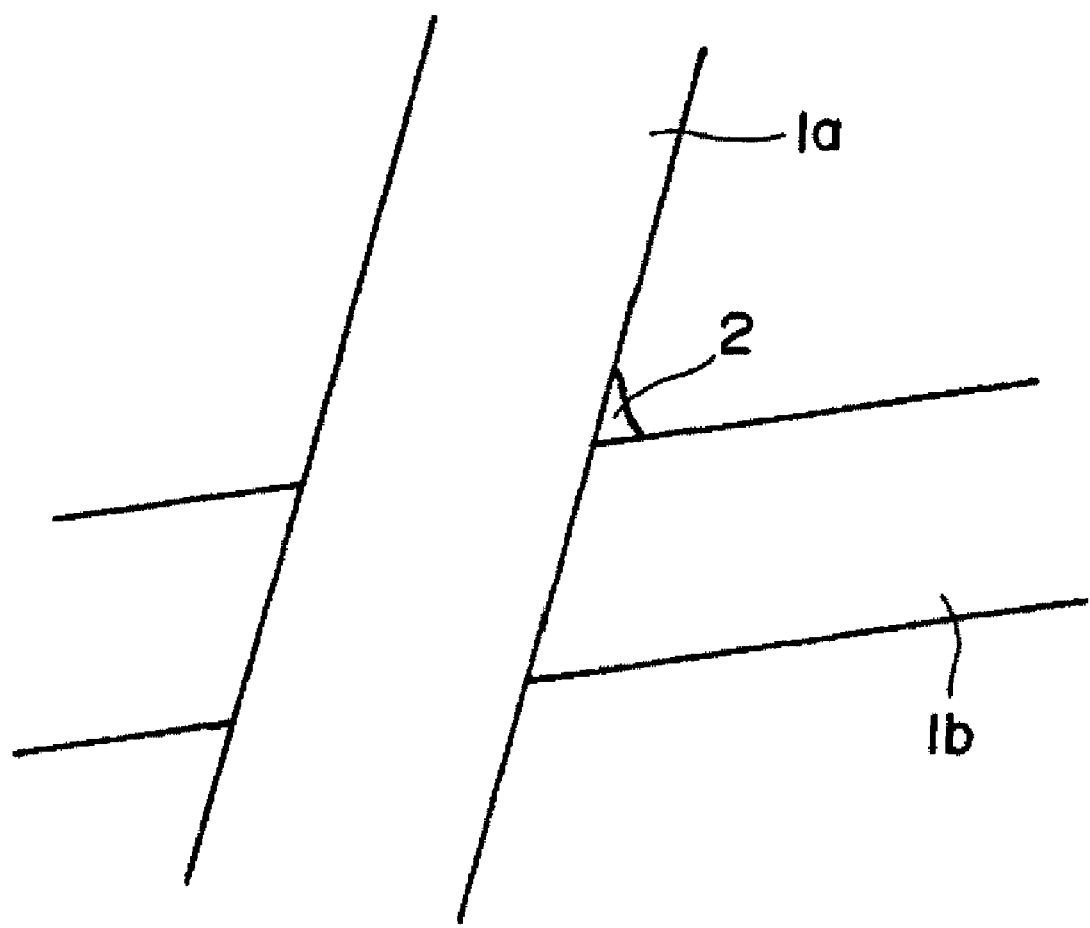
FIG. 1 illustrates a conceptional structure of basic magnesium sulfate granules prepared by the method of the invention.
Figure 2:
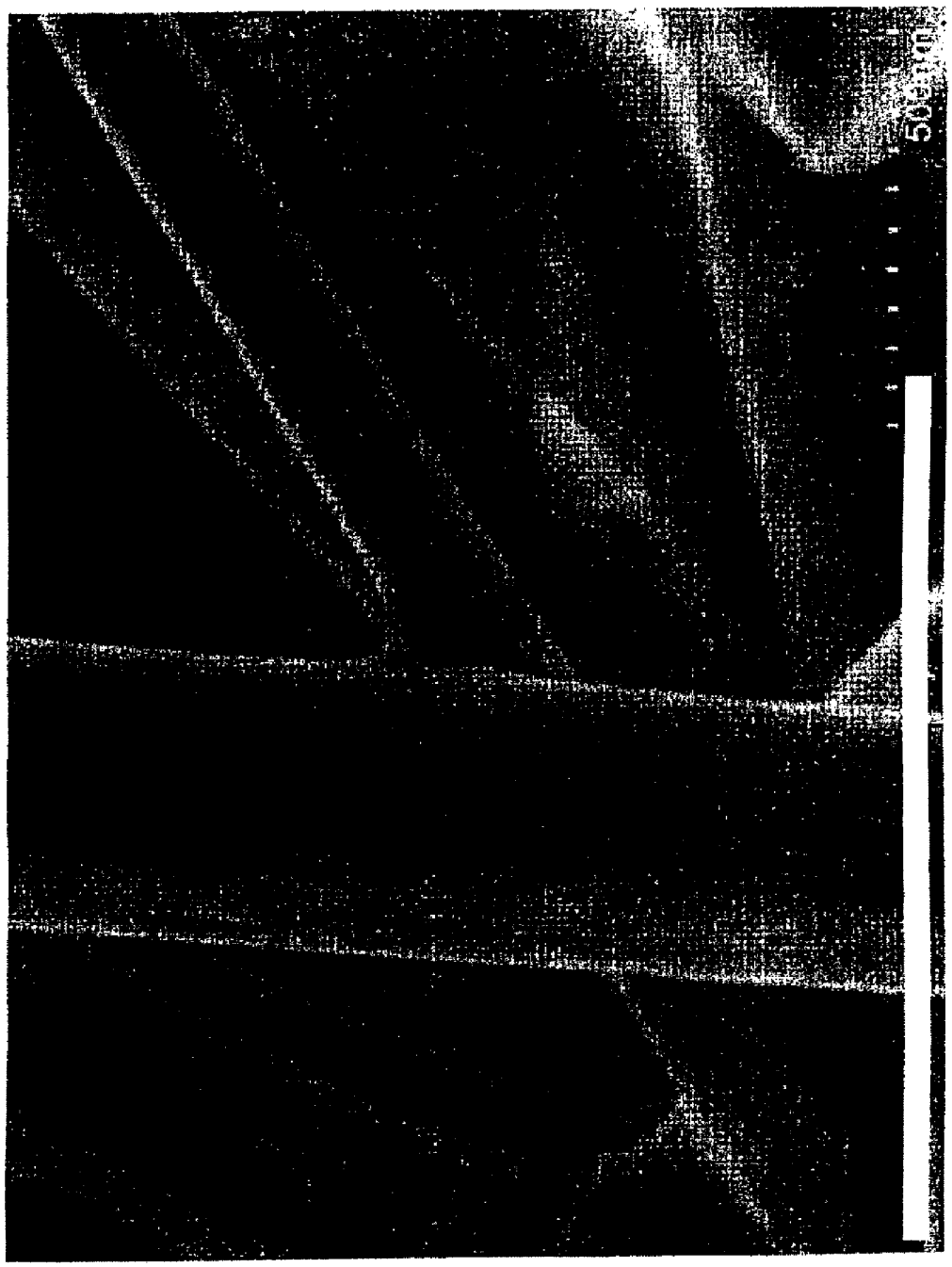
FIG. 2 is an electron microscopic photo of the basic magnesium sulfate granules prepared in Example 1.
Figure 3:
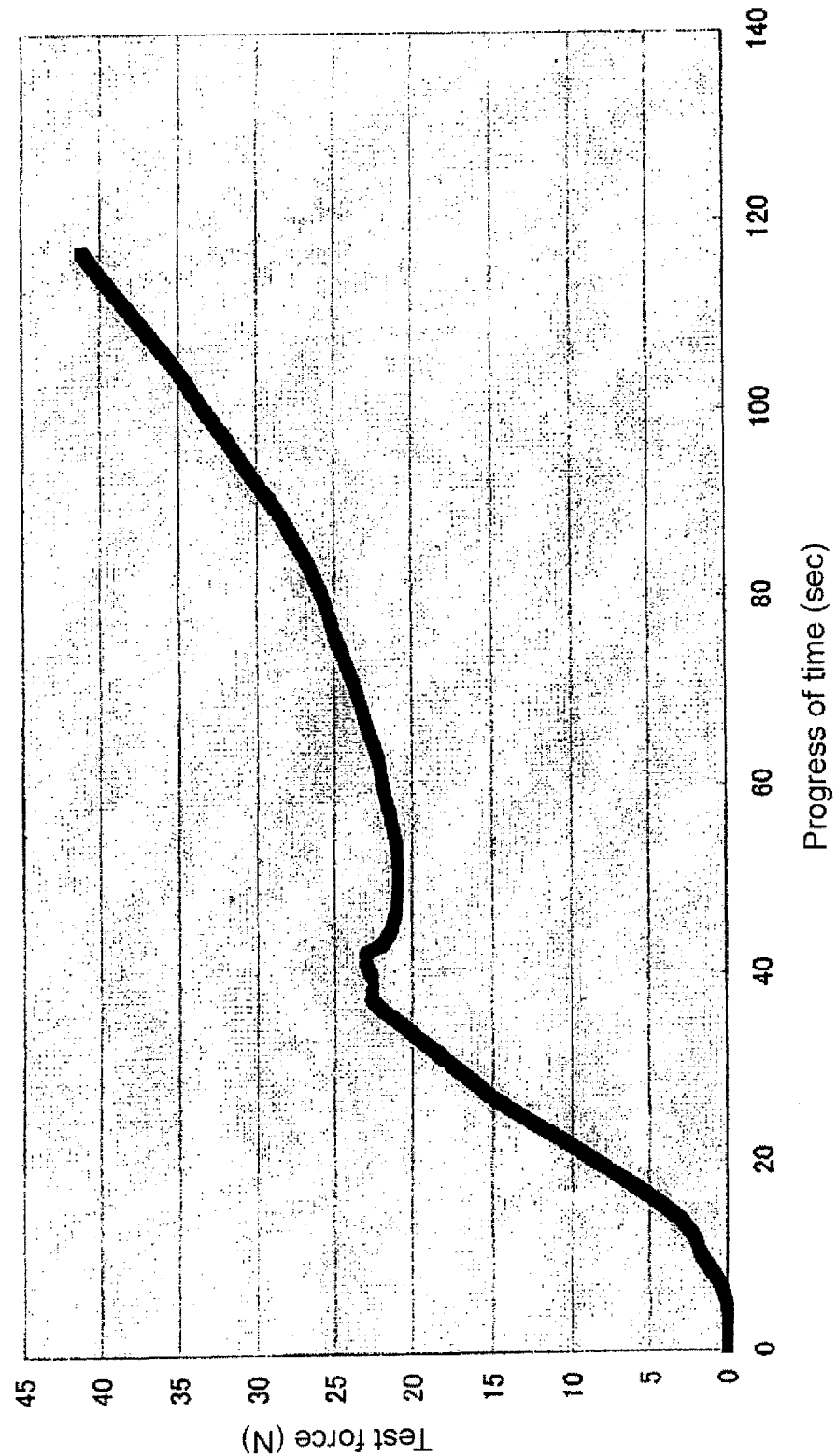
FIG. 3 is a graph illustrating a variation of test force in the progress of time observed when the basic magnesium sulfate granule prepared in Example 1 was placed under a compressing load applied by a pressing member moving at 0.5 mm/sec.

1a, 1b: fibrous basic magnesium sulfate particle

2: reaction product

What is claimed is:

1. A method for producing basic magnesium sulfate granules, which comprises heating a water-containing granular composition to a temperature of 50 to 250° C. for at least one hour, the water-containing granular composition having a water content of 10 to 60 wt. % and comprising fibrous basic magnesium sulfate particles, magnesium hydroxide in an amount of 5 to 300 weight parts based on 100 weight parts of the fibrous basic magnesium sulfate particles, magnesium sulfate in an amount of 0.1 to 200 weight parts based on 100 weight parts of a total amount of the fibrous basic magnesium sulfate particles and magnesium hydroxide.

2. The method of claim 1, wherein the fibrous basic magnesium sulfate particles have a mean length in the range of 3.0 to 200 μm, a mean thickness in the range of 0.2 to 3.0 μm, and a mean aspect ratio of 3 or more.

3. The method of claim 1, wherein the magnesium hydroxide is in the form of particles having a mean diameter in the range of 0.1 to 10 μm.

4. The method of claim 1, wherein the magnesium hydroxide is contained in an amount of 5 to 200 weight parts based on 100 weight parts of the fibrous basic magnesium sulfate particles.

5. The method of claim 1, wherein the magnesium sulfate is contained in an amount of 0.04 to 1 mole based on one mole of the magnesium hydroxide.

6. A method for producing basic magnesium sulfate granules, which comprises the steps of:

preparing an aqueous dispersion which comprises fibrous basic magnesium sulfate particles and magnesium hydroxide particles in an aqueous solution containing 1 to 40 wt. % of magnesium sulfate, the magnesium hydroxide particles being in an amount of 5 to 300 weight parts per 100 weight parts of the fibrous basic magnesium sulfate particles;

subjecting the aqueous dispersion to a dehydration procedure to give a water-containing composition containing 10 to 60 wt. % of water;

granulating the water-containing composition to give a water-containing granular composition; and heating the water-containing granular composition to a temperature of 50 to 250° C. for at least one hour.

7. A method for producing basic magnesium sulfate granules, which comprises the steps of:

granulating a mixture of fibrous basic magnesium sulfate particles, magnesium hydroxide particles and an aqueous solution containing 1 to 40 wt. % of magnesium sulfate, the magnesium hydroxide particles being in an amount of 5 to 300 weight parts per 100 weight parts of the fibrous basic magnesium sulfate particles, to give a water-containing granular composition containing 10 to 60 wt. % of water; and heating the water-containing granular composition to a temperature of 50 to 250° C. for at least one hour.

8. Basic magnesium sulfate granules produced by the method of any one of claims 1, 6 and 7, which have a bulk density in the range of 0.5 to 1.5 g/cm$^3$ and a crushing strength in the range of 1.0 to 10.0 kg.

9. Basic magnesium sulfate granules comprising fibrous basic magnesium sulfate particles, which have a bulk density in the range of 0.5 to 1.5 g/cm$^3$ and a crushing strength in the range of 1.0 to 10.0 kg.

10. The basic magnesium sulfate granules of claim 9, wherein the fibrous basic magnesium sulfate particles have a mean length in the range of 3.0 to 200 μm, a mean thickness in the range of 0.2 to 3.0 μm, and a mean aspect ratio of 3 or more.

\* \* \* \* \*